J. F. MATHENY.
CHECK ROW PLANTER.
APPLICATION FILED OCT. 26, 1914.
1,152,033.
Patented Aug. 31, 1915.
2 SHEETS—SHEET 1.
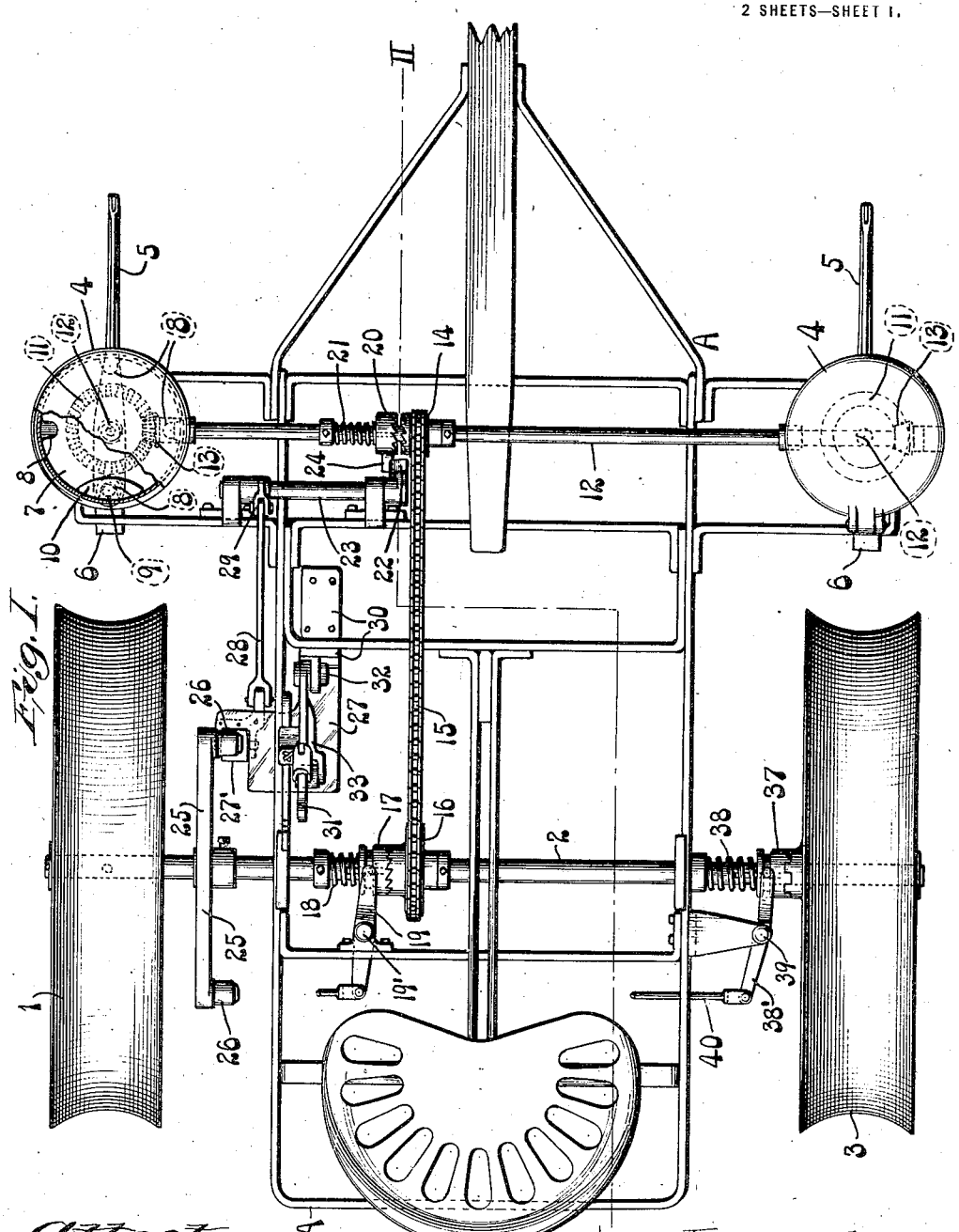
Inventor:
J. F. Matheny J. F. MATHENY.
CHECK ROW PLANTER.
APPLICATION FILED OCT. 26, 1914.
1,152,033.
Patented Aug. 31, 1915.
2 SHEETS—SHEET 2
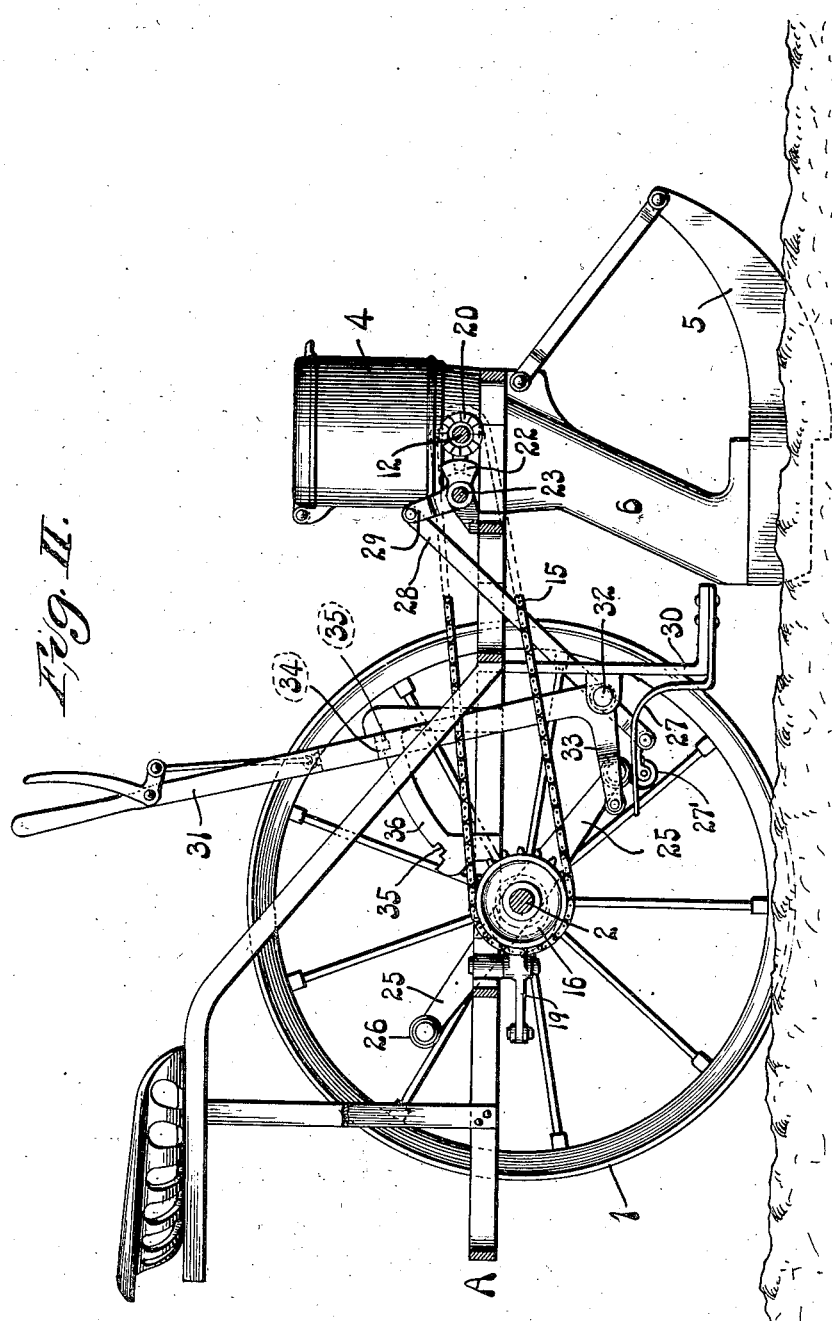
Inventor:
J. F. Matheny

UNITED STATES PATENT OFFICE.

JOHN F. MATHENY, OF VALLEY PARK, MISSOURI.

CHECK-ROW PLANTER.

1,152,033. Specification of Letters Patent. Patented Aug. 31, 1915.

Application filed October 26, 1914. Serial No. 868,623.

*To all whom it may concern:*

Be it known that I, JOHN F. MATHENY, a citizen of the United States of America, a resident of Valley Park, in the county of St. Louis, State of Missouri, have invented certain new and useful Improvements in Check-Row Planters, of which the following is a full, clear, and exact description, reference being had to the accompanying drawings, forming a part of this specification.

My invention relates to a check-row planter, one of the objects being to provide a simple and inexpensive means for operating or controlling the operation of a seed dropper.

The invention also includes details of construction which will be hereinafter pointed out.

Figure I is a top or plan view of a check-row planter, embodying the features of my invention. Fig. II is a vertical section taken approximately on line II—II, Fig. I.

1 designates a ground wheel fixed to an axle 2, and 3 is a ground wheel loosely secured to said axle. The axle is rotatably fitted to a main frame A, carrying seed hoppers 4 which contain the corn or other seed to be planted. Runners 5, at the front end of the main frame, are provided with seed chutes 6 adapted to receive the seed which drops from the hoppers 4. To illustrate the function of my improved means for controlling the seed dropping mechanism, I have shown a portion of a well known seed dropper consisting of a rotatable disk 7 provided with peripheral notches 8 which serve as pockets for holding the desired number of seeds. This notched disk 7 is seated on the bottom wall of a hopper 4 and it is turned intermittently to carry the seed to a discharge opening 9, shown by dotted lines in Fig. I. A small cover plate 10, secured to the hopper 4, extends over the discharge opening 9 and engages the top face of the notched disk to close the top of the notch or pocket 8 which registers with the discharge opening 9. Each seed hopper 4 is provided with a set of the mechanism just described.

The means for imparting an intermittent movement to the notched disks comprises bevel gear wheels 11 arranged below the seed hoppers and connected to shafts 12, the latter being secured to the notched disks. A drive shaft 12 extending across the front portion of the machine is provided with pinions 13 which mesh with the bevel gear wheels 11. A sprocket wheel 14 loosely fitted to the shaft 12, is driven through the medium of a chain 15 passing over a sprocket wheel 16, the latter being loosely secured to the axle 2.

17 designates a clutch member splined to the axle, and 18 is a spring tending to force said clutch member into engagement with clutch teeth on the sprocket wheel 16. A clutch shifter 19, pivotally supported at 19', may be operated to release the clutch member 17 from the sprocket wheel 16. When the planter is in service the clutch member 17 occupies the position shown in the drawings and the loose sprocket wheel 14, driven by the chain 15, rotates on the shaft 12. This loose sprocket wheel 14 is provided with clutch teeth adapted to interlock with a clutch member 20 splined to the shaft 12.

21 designates a spring tending to force the clutch member 20 into engagement with the clutch teeth of the loose sprocket wheel 14.

22 designates a cam fixed to a rock shaft 23 and serving as a stop for the clutch member 20, the latter having a finger 24 adapted to engage the inclined face of the cam 22. The shaft 23 may be rocked to shift the cam 22 away from the finger 24, thus permitting spring 21 to force the clutch member 20 into engagement with the rotating sprocket wheel 14. The shaft 12 will then be driven through the medium of sprocket wheel 14 and clutch member 20, and when said shaft 12 has almost completed one revolution, the finger 24 on the clutch member 20 travels along the inclined face of cam 22 with the result of shifting said clutch member 20 to the position shown in Fig. I.

One of the novel features of my invention lies in the means for operating the rock shaft 23 to control the movements of the seed dropping mechanism, and this operating means preferably comprises abutment arms 25 secured to the axle 2 and provided with rollers 26 at their outer ends. A resilient controller arm in the form of a spring 27 is arranged in the path of the abutment arms 25, and connected to the rock shaft 23 by means of a connecting bar 28 and a crank arm 29, said crank arm being fixed to the rock shaft 23. The resilient controller arm 27 is preferably secured to the main frame A by means of a leg 30 depending from said main frame, and the free portion of said arm 27 is adapted to be bent downwardly by the rotating abutment arms 25 which move about the axis of the axle. When the resilient controller arm 27 is deflected by one of the abutment arms, the connecting bar 28 and crank arm 29 are operated with the result of shifting cam 22 away from the finger 24, thereby permitting the clutch member 20 to engage the clutch teeth of sprocket wheel 14. Owing to its resilience, the controller arm 27 returns instantly when the abutment arm 25 passes over the free end of said controller arm, thereby restoring the cam 22 to its normal position where it will be engaged by the finger 24 when the shaft 12 has made one revolution.

31 designates a shifter lever, pivotally supported at 32, and provided with an arm 33 which overlies the free portion of the resilient controller arm 27. This shifter lever may be rocked to shift the free end of the controller arm 27 out of the path of the rotating abutment arms 25, and said lever 31 may be locked in position by means of a latch bolt 34 adapted to enter notches 35 in the quadrant 36. When the machine is not to be used as a planter, the lever 31 is adjusted and locked to prevent the abutment arms 25 from striking the resilient controller arm 27, and the clutch lever 19 is shifted to unclutch the driving mechanism.

The ground wheel 1 is fixed to the axle and ground wheel 3, loose on the axle, and is provided with clutch teeth adapted to be engaged by a clutch member 37 splined to the axle. A spring 38 tends to force the clutch 37 into engagement with the clutch teeth on the hub of wheel 3.

38′ designates a clutch shifter, pivoted at 39 and secured to an operating rod 40. The clutch shifter may be operated to disengage the clutch member 37 from the ground wheel 3.

When the machine is operated as a planter the clutch member 37 is engaged with the ground wheel 3 so that both of the ground wheels 1 and 3 are utilized as drive members for the axle. When the planter is to be turned at the end of a row the clutch member 37 is disengaged from the adjacent ground wheel to permit the ground wheels to rotate independently of each other. When the machine is traveling over a road or field, the clutch member 37 preferably occupies the position shown in Fig. I, and if the wheel 3 strikes an obstruction it may climb over such obstruction by partaking of the rotary movement of the other wheel; the axle being secured to both wheels so that one may be driven by the other.

The yieldable controller arm 27 is preferably provided with a roller 27′ which is engaged by the rollers 26 on the abutment arms 25, and owing to the location of the roller 27′ the yieldable controller arm is not subjected to injurious strains when the abutment arms are reversely rotated.

I claim:—

1. A planter having ground wheels, a rotatable axle supported by said ground wheels, a frame secured to said axle, a seed dropper carried by said frame, a rotatable shaft for operating said seed dropper, means for transmitting motion from said rotatable axle to said rotatable shaft, said means including a clutch member, and a controlling device comprising a rock shaft associated with said clutch member, an arm secured to said rock shaft, a spring having one of its ends secured directly to said frame and having its free portion pivotally connected to said arm, and abutment arms secured to said axle adapted to bend the free portion of said spring.

2. A planter having a seed dropper, means for operating said seed dropper intermittently, said means including a yieldable controller arm and a rotatable abutment arm adapted to strike said yieldable controller arm, and a manually operable shifter for moving said yieldable controller arm out of the path of said abutment arm, said yieldable controller arm being free to move independently of said manually operable shifter, and means for retaining said manually operable shifter in a position where it cannot partake of the movements of said yieldable controller arm.

3. A planter having ground wheels, a frame secured to said ground wheels, a seed dropper carried by said frame, seed dropping mechanism including a yieldable controller arm for controlling the operation of said seed dropper, and an abutment arm movable in a circular path in unison with said ground wheels, said yieldable controller arm being a spring having one of its ends secured directly to said frame and having a free portion adapted to be bent by said abutment arm, a manually operable shifter lever for moving the free portion of said spring out of the path of said abutment arm, said spring being free to move independently of said manually operable shifter lever, and means for locking said shifter lever to retain the free portion of said spring out of the path of said abutment arm.

JOHN F. MATHENY.

In the presence of—
E. K. CLARK,
A. J. McCAULEY.